INVENTOR.
NOEL B. BRAYMER
BY
Wilson, Roffins & Anderson
ATTORNEYS

INVENTOR.
NOEL B. BRAYMER
BY
Nilsson, Robbins & Anderson
ATTORNEYS

INVENTOR.
NOEL B. BRAYMER
BY
Nilsson, Robbins & Anderson
ATTORNEYS

United States Patent Office 3,369,181
Patented Feb. 13, 1968

3,369,181
SYSTEM FOR TRANSMITTING DIGITAL DATA VIA PULSE DOUBLETS

Noel B. Braymer, 966 Magellan,
Costa Mesa, Calif. 92626

Filed Mar. 18, 1964, Ser. No. 352,879
7 Claims. (Cl. 325—44)

ABSTRACT OF THE DISCLOSURE

A system of digital communication wherein all digital representations (including "zero") are converted into doublet signals including excursions in opposite senses to amplitudes representative of each digital representation. Thus, there is no direct-current component in the signal and phase reversals are employed to accomplish another dimension of information as for control signals and the like.

The present invention relates to an improved digital communication system, able to employ a single electrical channel that has limited bandwidth capability to economically and accurately communicate information in serial digital form.

Digital techniques are widely used to represent numerical and other information in such fields as automation, computer arts, telemetry, and instrumentation. One widely used format in which digital signals represent information employs binary code, i.e. two distinct digital signals represent "one" and "zero" values. Various binary code digital techniques are well-known in the prior art, some of which are explained in a book entitled "Arithmetic Operations in Digital Computers" by R. K. Richards, published 1955 by D. Van Nostrand Co., Inc.

Of course, systems based on various radices may be used to manifest digital data; however, in general, each discrete digital signal manifests a specific digital representation, i.e. either a numerical value or zero. For example, according to a binary signal format that has been extensively used, "one" values are manifest by a pulse e.g. a temporary voltage level change, rising above a reference level, and "zeros" are indicated by no change in the reference level. In receiving this pulse-no-pulse format, the binary signal must be supplemented by timing information to distinguish between "zero" and an interval of no transmission. That is, the signal in theoretical form has only two states, a higher level of amplitude indicating "one," and a lower level, reference or baseline, indicating "zero." As this signal dwells on the base line both during intervals of no transmission and when manifesting "zero," those intervals must be distinguished. Common practice has been to provide a separate clock signal or pulse to manifest intervals of actual data transmission during which either a "zero" or a "one" is manifest. The clock signal may be implied from the data signal; however, such implicit timing information is sometimes ambiguous or erroneous. Therefore, prior systems have often included the separate channel to transmit accurate clock pulses for interpreting the data signal. Of course, the provision of such a channel significantly increases the cost of the total system.

Prior art systems employing the pulse-no-pulse form of representation inherently include a direct-current component in the transmitted signal. Thus, the communication channel must be capable of accommodating this direct-current signal component which places stringent bandwidth capabilities upon the channel.

Various techniques and apparatus have been proposed to compensate for the inability of various economical communication channels to pass a signal with a significant D.C. component. However, these techniques have generally been expensive and complex, particularly when applied to the receiving terminal of the communication system.

In general, the present system employs pulse doublets of similar phase but of different amplitude to discretely manifest digital representations. For example, a "one" may be manifest by a doublet signal including excursions in opposite senses to a predetermined amplitude, while a "zero" is manifest by a similar doublet signal of reduced amplitude. As a result, there is no direct-current signal component and each doublet preserves the base line or reference signal level undisturbed and the communication channel need not accommodate a direct-current component. Timing information, e.g. clock signals, when such are desired may be made explicit in the transmitted data signal, which may therefore be accommodated by a single communication channel while providing the accuracy of systems incorporating a separate clock channel.

An object of the present invention is to provide an improved digital communication system.

Another object of the present invention is to provide a digital communication system wherein a single channel may accommodate signals in digital representations without a direct-current component therein.

Another object of the present invention is to provide a binary communication system including a transmission channel of limited bandwidth.

Another object of the present invention is to provide an improved digital communication system which may be inexpensively constructed and which will provide reliable operation to accurately transmit digital signals.

These and other objects of the present invention will become apparent from a consideration of the following description taken in conjunction with the accompanying drawings which are presented by way of example, wherein.

Figure 1:
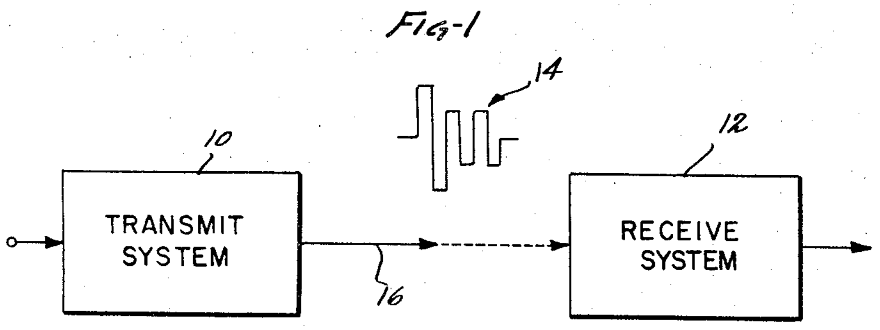
FIG. 1 is a block diagram illustrative of a communication system incorporating the principles of the present invention.

Referring to FIG. 1, there is shown a block 10 representing a transmit system and a block 12 representing a receive system. The transmit system 10 receives a signal from any desired source containing wanted information. This signal is converted by the transmit system 10 into the waveform 14 containing the pulse doublets of the present invention. This waveform is transmitted over a communication channel 16 to the receive system represented by the block 12 and there converted to a form usable by whatever apparatus may be connected to the receive system.

In considering the system as shown in FIG. 1, it is to be understood that the apparatus may take a wide variety of forms and may include various numbers of channels to accommodate parallel signals or other data-representing signals. However, common to such apparatus is a form of transmitted doublet signals which includes excursions in opposite senses from the base line, in which discrete digital representations are distinguished by signal amplitude. For example, the doublet having the greater amplitude may represent a binary one while the lesser amplitude doublet represents a binary zero.

The doublet signals, each half being equal in amplitude and opposite in polarity, preserve the base line intact. Of course, the assigned amplitude representation is arbitrary and may be altered, as also may the phase of the waveform. However, the base line still remains unaffected, even during long sequences of no transmission, long sequences of transmitted "zeros," or long sequences of transmitted "ones."

Figure 2:
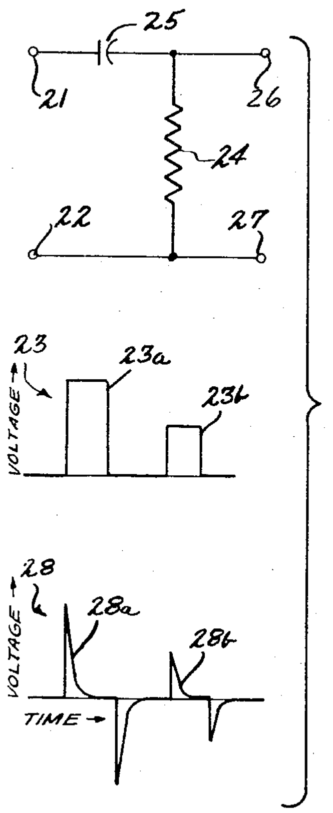
FIG. 2 is a diagrammatic representation of the transmit portion of the system incorporating the principles of the present invention.

Referring now more particularly to FIG. 2 there is illustrated one embodiment of means for forming a pulse doublet in accordance with the present invention. A pair of input terminals 21 and 22 have an input signal as represented at 23 applied thereto. The input signal 23 is, for example, a pair of pulses of different amplitude. Each pulse represents a different binary value, for example, the pulse 23*a* having the greater amplitude could represent a binary one and the smaller pulse 23*b* a binary zero. The forming circuit is a simple series R–C circuit having the resistor 24 and capacitor 25 therein with output terminals 26 and 27 across the resistor 24. The time constant of the circuit is chosen to be short with respect to the duration of a pulse in signal 23. Therefore, the output signal 28 is a pulse doublet, that is a signal having positive and negative going excursions of equal amplitude. As is illustrated the pulse 23*a* has been converted to a pulse doublet 28*a* and the pulse 23*b* to the doublet 28*b* of lesser amplitude.

Figure 3:
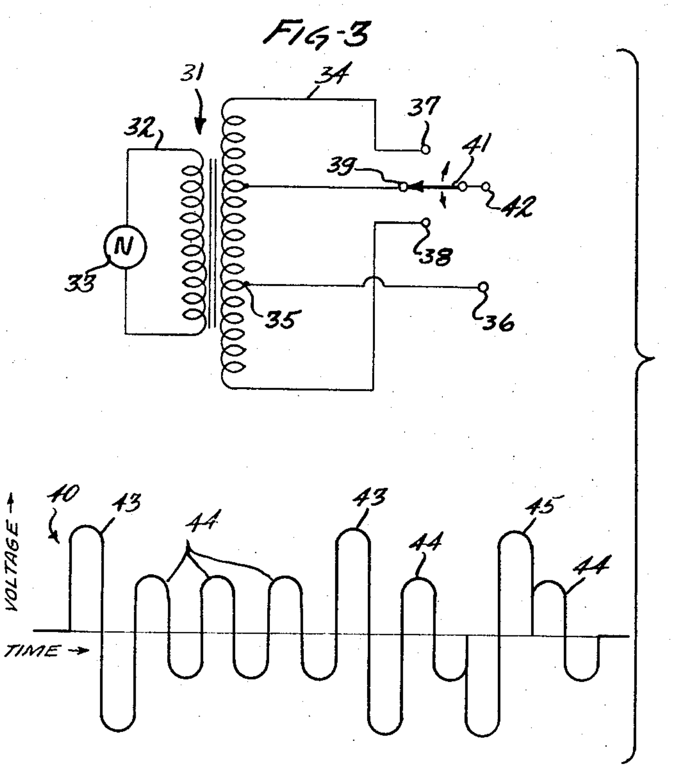
FIG. 3 is a diagrammatic representation of an alternate to the transmit portion of the system represented in FIG. 2.

An alternative arrangement for forming a pulse doublet signal in accordance with the present invention is shown in FIG. 3. A transformer 31 includes a primary winding 32 having an A–C signal source 33 connected thereto. A secondary winding 34 includes a center tap 35 having one output terminal 36 connected thereto. Stationary switch terminals 37 and 38 are connected to opposite sides of the winding 34 while a third stationary terminal 39 is connected to winding 34 intermediate center tap 35 and terminal 37. A movable switch arm 41 selectively contacts terminals 37–39 in accordance with the intelligence information supplied thereto. When arm 41 contacts terminal 37 a large amplitude pulse doublet is formed across terminals 36 and 42 as shown at 43; when 39 is contacted a smaller amplitude signal 44 is formed; and when terminal 38 is contacted a reverse phase large amplitude signal 45 is formed. The signals 43 and 44 can represent a binary one and zero respectively while the signal 45 can be used for control purposes.

The output signal as shown generally at 28 or 40 containing intelligence information in the form of pulse doublets having first and second amplitudes can be transmitted over a simple communication channel of limited bandwith with excellent accuracy. It should of course be understood that may other circuits of varying complexity can be derived by those skilled in the art to develop the pulse doublet signal in accordance with the present invention.

Figure 4:
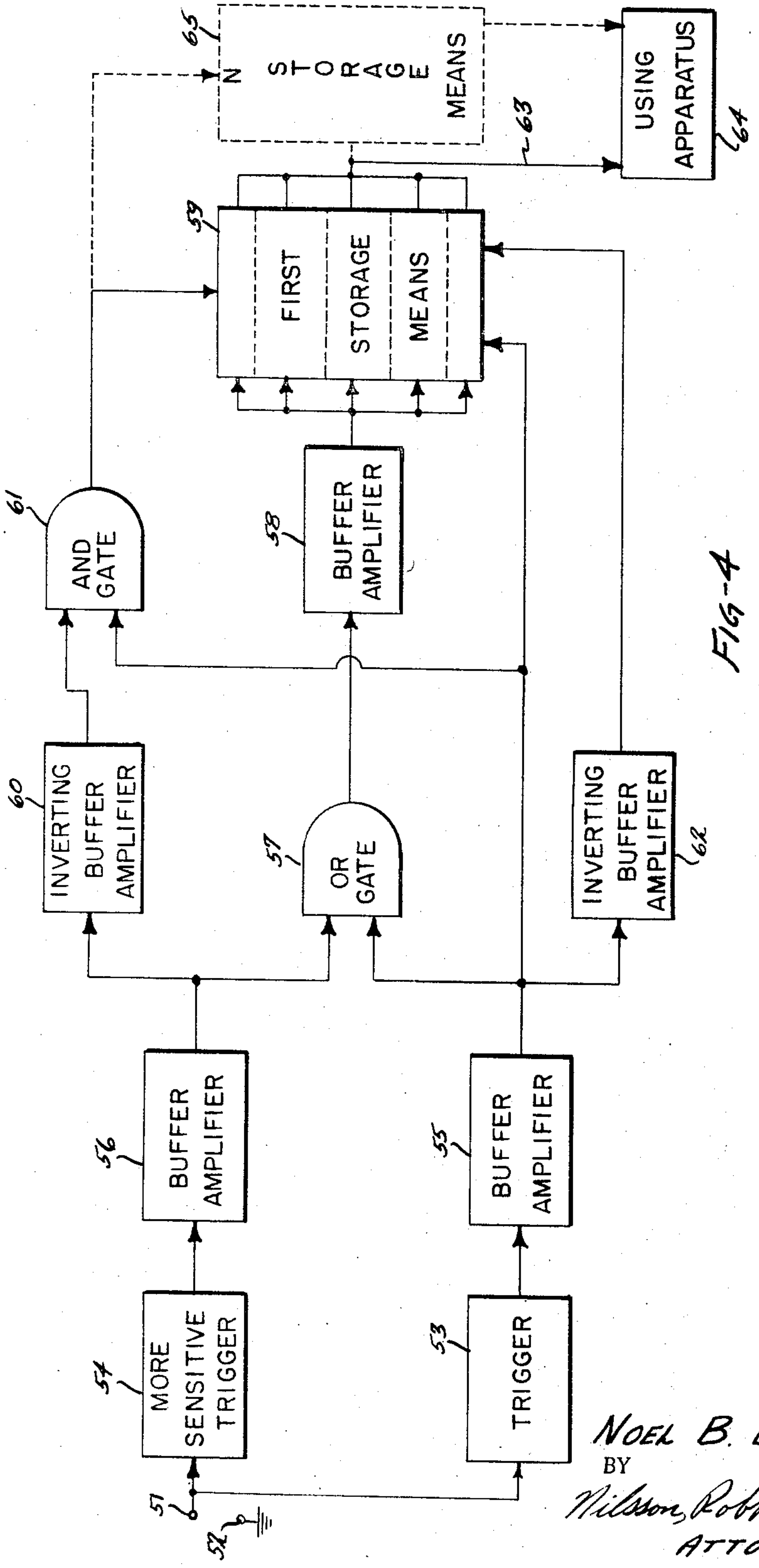
FIG. 4 is a diagrammatic representation of the receive portion, having storage and utilizing apparatus connected thereto, of the system incorporating the principles of the present invention.

An example of one detailed received system is illustrated in block form in FIG. 4. As is therein shown signals from the transmit system 10 are received at terminals 51 and 52. Receive terminal 51 is connected to a trigger 53 which may be any trigger circuit known such as a Schmitt trigger. Receive terminal 51 is also connected to a more sensitive trigger 54, that is a trigger circuit which has a lower firing potential. The output signal from the triggers 53 and 54 are connected as input signals to buffer amplifiers 55 and 56 respectively.

The output signals from buffer amplifiers 55 and 56 are connected to "or" gate 57, the output of which is in turn connected through a buffer amplifier 58 as a control signal to each module of a first storage means 59. The output signal of buffer amplifier 56 is inverted by inverting buffer amplifier 60 and applied as one input signal to "and" gate 61, the other input being the signal from buffer amplifier 55. The output signal from buffer amplifier 55 is also inverted by inverting buffer amplifier 62 and both the output and the inverted output signals are connected as the data signals to the storage means 59.

Upon a command, indicative of the end of a particular message, applied from "and" gate 61 to the storage means 59, the information contained therein is transferred by way of lead 63 to a using apparatus 64 such as a printer, scope, or the like. Alternately the information could be transferred to other storage means of any predetermined number as indicated by N-storage means 65 and when commanded applied to the using apparatus 64 as indicated by the dashed lines.

"And" gates, "or" gates, and buffer amplifiers are well known in the art and may be, for example, of the type shown and described in U.S. Patent 2,769,971.

Figure 5:
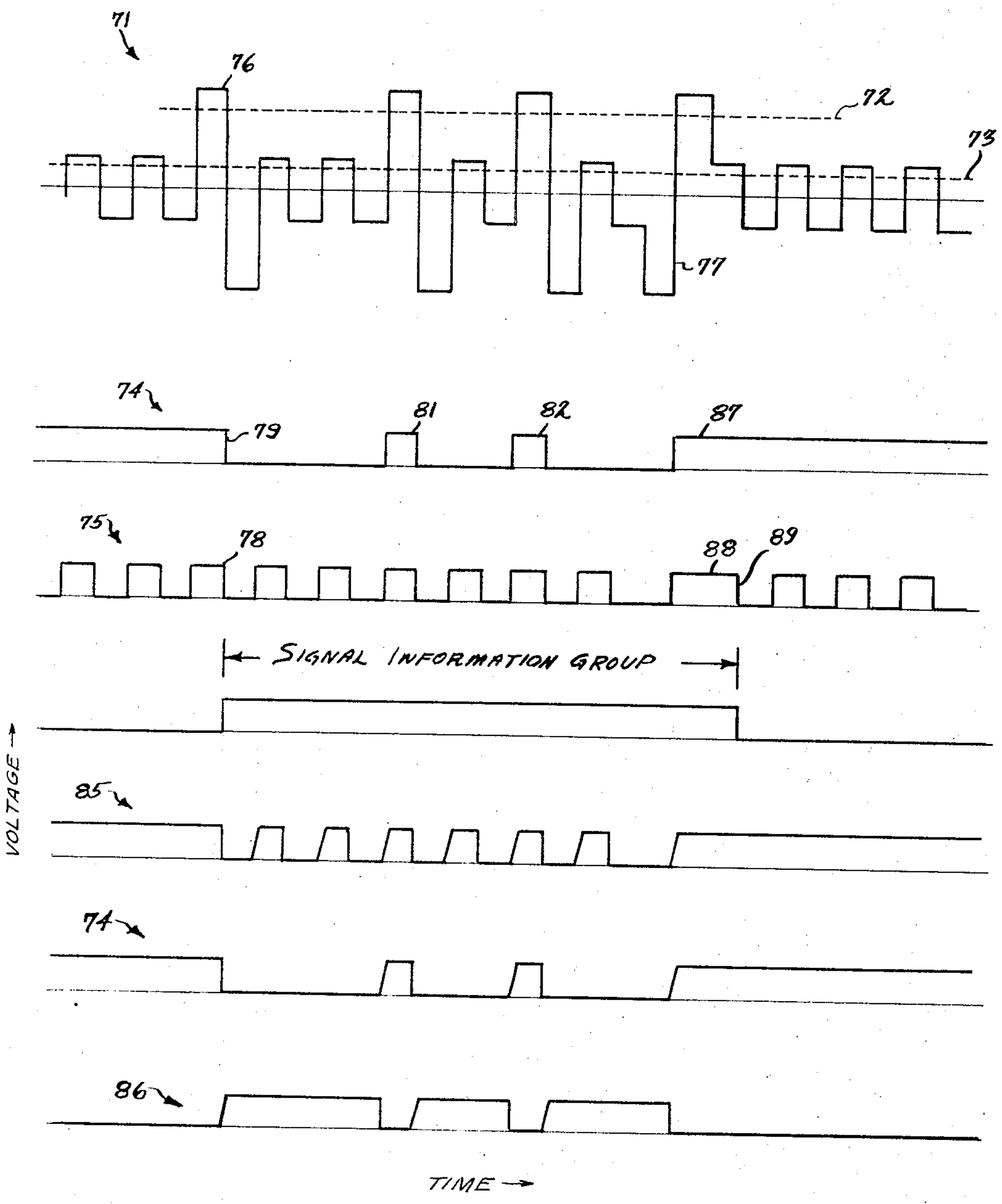
FIG. 5 is a presentation of theoretical waveforms in the system of FIG. 4.

A more thorough understanding of the present invention will be obtained by referring to the wave forms shown in FIG. 5 which are taken at various points throughout the system of FIG. 4.

Intelligence signal 71 is formed by transmit system 10 and applied by the communication channel 16 to terminals 51 and 52. The waveforms 28 or 40 as shown in FIGS. 2 and 3, are applied to pulse shapers which may include various clipper circuits and other well known apparatus to formulate the transmitted waveform as shown at 71 into the substantially rectangular pulse doublets. It is these doublets which manifest digital information in accordance with the present invention.

The waveform 71 includes a plurality of doublets or opposite sensed pulses with each doublet representing either a "one" or a "zero." The higher-amplitude doublets manifest "ones" while the low-amplitude doublets indicate "zeros." It is to be noted that the transmitted signal or waveform 71 has no direct current component and therefore preserves the base line intermediate the doublets undisturbed. Of course, this interval of the base lince can be eliminated if desired, so that the base line is manifest only during null intervals. This is simply a matter of timing, as is well known.

As indicated earlier the transmited signal is applied by way of terminals 51 and 52 to the trigger circuits 53 and 54. These circuits may take various forms, including the well-known Schmitt trigger circuit, capable of providing a two-state output signal under control of an input signal relative to threshold levels. That is, in operation, the trigger circuits 53 and 54 provide reference-value signals until the input to these circuits exceeds a predetermined level. Upon such instance, the output signals from the trigger circuits raise to a defined level indicative of the second state of the two-state output signals.

Referring to FIG. 5, the dashed lines 72 and 73 indicate the upper threshold levels of the trigger circuits 53 and 54 respectively. Therefore, the trigger circuit 53 provides a pulse output when the input signal from the receiving terminals 51–52 exceeds the threshold level 72, terminating the pulse when the input signal drops below the base line. Therefore, the output from the trigger circuit 53 is indicated by the theoretical waveform 74.

The trigger circuit 54 has a threshold level indicated by the line 73 in FIG. 5; therefore, that circuit provides an output pulse for each voltage doublet received, with the result that timing or command pulses as shown by the theoretical waveform 75 may be derived from the trigger circuit 54. As is thus seen both the timing information and the data is transmitted by a single signal over a communication channel which need not accommodate a direct current signal component.

The operation of the illustrative system of FIG. 4 to accomplish digital communication may be best explained by assuming certain initial conditions for transmission of a block of data, and considering the sequence of events which follow as they relate to each of the individual circuits. Therefore, assume initially that the trigger circuit 53 is set to provide a high-level signal and that a block of data is about to be applied as digital signals to the channel 16. Assume further, that the block of data is a digital word, of some predetermined length, and that in the format of such words a "one" pulse, e.g. 76 indicating "start" precedes the remainder of the word and at the conclusion of the word, a reverse phase "one" signal, e.g. 77, appears; the "start" may be considered the "sync" signal and the reverse phase "one" the "post" sync" signal. Of course, various other format configurations within the digital word or external thereto may be provided to indicate the digital word.

Upon occurrence of the "sync" pulse 76 trigger circuit 54 produces a pulse 78 while the high-level state of trigger circuit 53 is changed to the low level state as the sync pulse 76 passes through the base line as is shown at 79, therefore, the system is now ready to receive the first data information. As the transmitted signal 71 is applied to the trigger circuit 54 an output pulse is developed for each input doublet irrespective of amplitude as shown at 75. These pulses are passed by buffer amplifier 56 and are applied to "or" gate 57. Trigger circuit 53, however, produces a pulse only when a "one" indicating pulse doublet is received as shown at 81 and 82 in signal 74. This signal is passed by buffer amplifier 55 and applied as the other input to "or" gate 57. The output of the "or" gate 57 is then applied to the buffer amplifier 58 where the leading edge may be delayed slightly as shown by waveform 85 and then applied as a shift command signal to the storage means 59. The storage means 59, may, for example, be a plurality of flip-flops each carrying one information bit which is transferred to the next flip-flop upon receipt of the shift command.

The output signal 74 from buffer amplifier 55 is inverted by inverting buffer amplifier 62 as shown at 86. The signal 74 and its complement, waveform 86, are then applied as the data containing signal to the storage means 59.

Upon conclusion of the message the "post sync" pulse doublet 77 is received by trigger circuits 53 and 54 setting them both to a high-level state as shown at 87 and 88. Trigger 53 remains in this state but trigger 54 is promptly reset to its low level state by the following pulsed doublet as shown at 89. "And" gate 61 is arranged to pass a signal only upon the presence, as inputs thereto, the absence of an output from trigger 54 and a high level signal from trigger 53. This state occurs immediately following "post sync" 77 and it is the occurrence of this state which provides a command signal from "and" gate 61 to the storage means 59 to cause the message just stored to be shifted to another higher order storage apparatus or to the using apparatus 64. The trigger circuits are now back in the initially assumed condition and ready for the next "sync" pulse and message.

The transmit system can be viewed as a modulating means which forms pulse doublets of differing amplitudes in accordance with intelligence contained in a signal. The received system can be viewed as a demodulating means which converts the pulse doublets to usable binary data.

From the consideration of the illustrative system disclosed herein, it is apparent that the present invention may take many varied forms to provide considerable utility for the economical transmission of digital signals from one electrical apparatus to another. The system facilitates inexpensive transmission channels while accomplishing high reliability.

Other important features of the present invention will be readily apparent to one skilled in the art; however, it is to be understood that the present invention is not to be limited to the details of the embodiments disclosed herein, which have been presented by way of example only and in the cause of providing an understandable teaching. The scope of the invention is to be determined in accordance with the claims set forth below.

What is claimed is:

1. A binary communication system comprising: a forming means for translating intelligence containing first and second binary representations into first and second cycles of an electrical signal, said sycles each including excursions in opposite senses from a reference level, wherein the amplitude of excursions for said first cycle are greater than the amplitude of excursions for said second cycle; a demodulator means for manifesting binary intelligence in accordance with said electrical signal, wherein greater amplitude excursions are manifest as first binary representations and lesser amplitude excursions are manifest as second binary representations; and a transmission means for transmitting said electrical signal from said forming means to said demodulator means.

2. A digital communication system comprising: a modulator means for translating first and second binary representations into first and second cycles of an electrical signal, said cycles including excursions in opposite senses from a reference level, wherein the amplitude of excursions for said first binary representations are greater than the amplitude of excursions for said second binary representations; a first trigger circuit having a two-state output determined by whether an input thereto is above or below threshold; a second trigger circuit similar to said first trigger circuit having a lower threshold than said first trigger circuit; and means for applying said binary doublet signals to each of said trigger circuits whereby the first trigger circuit provides pulse-no-pulse signals and said second trigger circuit provides a timing signal.

3. A system according to claim 2 further comprising means to form other cycles similar said first and second cycles in said electrical signals which are of reversed phase, whereby to manifest format information.

4. A system according to claim 3 further comprising means operative by said other cycles to control the flow of signals in said system.

5. A digital communication system for transferring intelligence represented by discrete signals indicative of at least one number digit and a zero, whereby signals are substantially continually in transfer, comprising:

forming means for translating intelligence representative of a zero and of each of said number digits into cycles of an electrical signal, each of said cycles including excursions in opposite senses from a reference level, to an amplitude indicative of the represented intelligence;

a demodulator means for manifesting said intelligence whereby said cycles of an electrical signal representative of zero are reduced to timing signals and said cycles of an electrical signal representative of number digits are reduced to number representative signals; and a signal transmission means for transmitting said cycles of an electrical signal from said forming means to said demodulator means.

6. A system according to claim 5 wherein said demodulator means includes means for providing a signal upon occurrence of each cycle of said electrical signal.

7. A system according to claim 6 wherein said means for providing a signal includes phase inverting means.

References Cited

UNITED STATES PATENTS

| | | | |
|---|---|---|---|
| 2,577,475 | 12/1951 | Miller | 328—117 |
| 3,223,972 | 12/1965 | Uizurrun | 328—117 X |
| 3,267,375 | 8/1966 | Olsen | 328—116 X |
| 3,278,851 | 10/1966 | Damon et al. | 328—34 |
| 2,360,579 | 10/1944 | Potts | 178—67 X |

FOREIGN PATENTS

| | | |
|---|---|---|
| 896,369 | 5/1962 | Great Britain. |

JOHN W. CALDWELL, *Primary Examiner.*

J. T. STRATMAN, *Assistant Examiner.*